US009539758B2

United States Patent
Bhosale et al.

(10) Patent No.: US 9,539,758 B2
(45) Date of Patent: Jan. 10, 2017

(54) FRICTIONAL WELD JOINT FOR AN ARTICLE COMPRISING A THERMOPLASTIC MATERIAL

(71) Applicant: BASF SE, Ludwigshafen (DE)

(72) Inventors: Ankur Bhosale, Canton, MI (US); Prasanna Kondapalli, Ypsilanti, MI (US); William J. McMaster, Berkeley Heights, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/400,742

(22) PCT Filed: May 23, 2013

(86) PCT No.: PCT/US2013/042430
§ 371 (c)(1),
(2) Date: Nov. 12, 2014

(87) PCT Pub. No.: WO2013/177399
PCT Pub. Date: Nov. 28, 2013

(65) Prior Publication Data
US 2015/0132046 A1 May 14, 2015

Related U.S. Application Data

(60) Provisional application No. 61/650,563, filed on May 23, 2012.

(51) Int. Cl.
*B29C 65/06* (2006.01)
*B29C 65/08* (2006.01)
(Continued)

(52) U.S. Cl.
CPC ............. *B29C 65/06* (2013.01); *B29C 65/08* (2013.01); *B29C 66/12443* (2013.01);
(Continued)

(58) Field of Classification Search
CPC .. Y10T 403/477; B29C 65/06; B29C 65/0618; B29C 65/08
See application file for complete search history.

(56) References Cited

U.S. PATENT DOCUMENTS 4,601,927 A 7/1986 Durfee
4,631,685 A 12/1986 Peter
(Continued)

FOREIGN PATENT DOCUMENTS

CN 1593834 A 3/2005
CN 101124396 A 2/2008
(Continued)

OTHER PUBLICATIONS

English language abstract and machine-assisted English translation for JPH 07-186263 extracted from espacenet.com database on Jul. 6, 2015, 20 pages.
(Continued)

*Primary Examiner* — Daniel P Stodola
*Assistant Examiner* — Jonathan Masinick
(74) *Attorney, Agent, or Firm* — Howard & Howard Attorneys PLLC

(57) ABSTRACT

A frictional weld joint couples together first and second body portions of an article. The first body portion has a first nominal wall thickness and a first joint surface. The second body portion has a second nominal wall thickness and a second joint surface. A total bead height is defined between the joint surfaces. A first bead extends from the first joint surface defining a first bead height. A second bead extends from the second joint surface and is coupled to the first bead. A final second bead height is defined between the first bead and the second joint surface. A ratio of the first bead height to the final second bead height is of from about 0.40 to about 1.70. A ratio of the total bead height to at least one of the first and second nominal wall thicknesses is equal to or less than 6.00.

20 Claims, 2 Drawing Sheets

(51) Int. Cl.
*F02M 35/10* (2006.01)
*B29L 31/00* (2006.01)
*B29C 65/00* (2006.01)
*B29L 31/30* (2006.01)

(52) U.S. Cl.
CPC ........ *B29C 66/1312* (2013.01); *B29C 66/322* (2013.01); *B29C 66/343* (2013.01); *B29C 66/54* (2013.01); *B29C 66/73921* (2013.01); *F02M 35/1036* (2013.01); *F02M 35/10321* (2013.01); *B29C 66/1142* (2013.01); *B29C 66/71* (2013.01); *B29C 66/721* (2013.01); *B29C 66/7212* (2013.01); *B29C 66/72141* (2013.01); *B29C 66/72143* (2013.01); *B29C 66/9513* (2013.01); *B29L 2031/3055* (2013.01); *B29L 2031/7172* (2013.01); *B29L 2031/747* (2013.01); *B29L 2031/7492* (2013.01); *Y10T 403/477* (2015.01)

(56) References Cited

U.S. PATENT DOCUMENTS

| | | | |
|---|---|---|---|
| 4,919,987 A | 4/1990 | Manner | |
| 5,199,593 A | 4/1993 | Kita | |
| 5,263,606 A * | 11/1993 | Dutt | B29C 65/08 156/272.2 |
| 5,401,342 A | 3/1995 | Vincent et al. | |
| 5,540,808 A | 7/1996 | Vincent et al. | |
| 5,670,108 A | 9/1997 | Kern et al. | |
| 5,914,159 A | 6/1999 | Kato | |
| 6,001,201 A | 12/1999 | Vincent et al. | |
| 6,131,573 A * | 10/2000 | Brown | A61B 5/097 128/202.28 |
| 6,179,157 B1 | 1/2001 | Merz | |
| 6,209,541 B1 * | 4/2001 | Wallace | A61M 16/1055 128/200.24 |
| 6,447,866 B1 | 9/2002 | Kagan et al. | |
| 6,588,970 B1 | 7/2003 | Natrop | |
| 6,663,933 B2 | 12/2003 | Nakajima et al. | |
| 6,706,357 B2 | 3/2004 | Sugimura et al. | |
| 6,726,790 B2 | 4/2004 | Kagan et al. | |
| 6,913,186 B2 | 7/2005 | Vyas | |
| 6,988,478 B2 | 1/2006 | Tanikawa et al. | |
| 7,174,873 B2 | 2/2007 | Uematsu | |
| 7,331,652 B2 | 2/2008 | Hattori et al. | |
| 7,451,732 B1 * | 11/2008 | Vichinsky | F02M 25/089 123/184.42 |
| 7,516,871 B2 * | 4/2009 | Gerbron | B65D 1/32 215/250 |
| 8,186,324 B2 * | 5/2012 | Iwata | F02M 35/10144 123/184.21 |
| 2003/0155062 A1 | 8/2003 | Kagan et al. | |
| 2003/0205565 A1 | 11/2003 | Nelson et al. | |
| 2004/0145177 A1 | 7/2004 | Miyahara et al. | |

FOREIGN PATENT DOCUMENTS

| | | |
|---|---|---|
| EP | 1 602 468 A2 | 12/2005 |
| JP | H 06-285994 A | 10/1994 |
| JP | H 07-186263 A | 7/1995 |
| JP | H 11-227051 A | 8/1999 |
| JP | 2003-260737 A | 9/2003 |
| JP | 2005-319613 A | 11/2005 |
| JP | 2005-337108 A | 12/2005 |
| JP | 2009-066819 A | 4/2009 |
| JP | 2013-099778 A | 5/2013 |
| WO | WO0128757 A1 | 4/2001 |
| WO | WO 02/14052 A1 | 2/2002 |
| WO | WO2012162362 A2 | 11/2012 |

OTHER PUBLICATIONS

English language abstract and machine-assisted English translation for JP 2003-260737 extracted from espacenet.com database on Jul. 6, 2015, 11 pages.
English language abstract and machine-assisted English translation for JP 2005-319613 extracted from espacenet.com database on Jul. 6, 2015, 25 pages.
Kagan, Val. A. et al., "The Effects of Weld Geometry and Glass-Fiber-Orientation on the Mechanical Performance of Joints—Part II: Kinetics of Glass-Fiber-Orientation and Mechanical Performance", Journal of Reinforced Plastics and Composites, vol. 23, No. 16, 2004, XP007901644, pp. 1687-1694.
International Search Report for PCT/US2012/039088 dated Aug. 3, 2012, 3 pages.
International Search Report for PCT/US0213/042430 dated Oct. 18, 2013, 2 pages.
Chevron Phillips Chemical Company LP, "Ultrasonic Welding Ryton PPS Compounds", Ryton Polyphenylene Sulfide Resins, Technical Service Memorandum, TSM-324, Jan. 2002, www.cpchem.com/bl/rytonpps/en-us/documents/tsm324.pdf, printed 2011, 3 pages.
Eastman Chemical Company, "Ultrasonic Welding of Eastman Polymers", Publication TRS-216A, Jul. 2004.
Kenney, Warren E., Joint Design a Critical Factor in Strong Bonds, originally published Spring 1995 in Engineering Design Magazine, 3 pages.
Sonics & Materials, Inc., Joint Designs for Ultrasonic Welding, 2001, www.sonics.com/plastic-tech-bulletines/joint_designs_for_ultrasonic_welding.pdf, printed 2011, 4 pages.
Sonitek, Joint Design for Ultrasonic Welding, Feb. 2000, www.sonitek.com/ultrasonics/literature/joint%20design.pdf, printed 2011, 4 pages.
English language abstract and machine-assisted English translation for JPH 11-227051 extracted from espacenet.com database on Feb. 8, 2016, 13 pages.
English language abstract and machine-assisted English translation for WO 02/14052 extracted from espacenet.com database on Feb. 8, 2016, 16 pages.
English language abstract for CN 1593834 extracted from espacenet.com database on Nov. 2, 2015, 1 page.
English language abstract and machine-assisted English translation for JPH 06-285994 extracted from espacenet.com database on Aug. 18, 2016, 8 pages.
English language abstract for JP 2005-337108 extracted from espacenet.com database on Aug. 18, 2016, 2 pages.
English language abstract and machine-assisted English translation for JP 2009-066819 extracted from espacenet.com database on Aug. 18, 2016, 25 pages.
English language abstract and machine-assisted English translation for JP 2013-099778 extracted from espacenet.com database on Aug. 18, 2016, 31 pages.
Dupont, "General Design Principles for DuPont Engineering Polymers (Design Guide—Module I)", 2000, XP007904729, downloaded from http://plastics.dupont.com/plastics/pdflit/americas/general/H76838.pdf on May 16, 2008, pp. 1-136.
Forward Technology (A Crest Group Company), "Hot Plate Welders—Hot Plate General Brochure 205.77 KB", 2006, XP000962871, downloaded from http://www.forwardtech.com/plasticassembly/hotplate/ on Mar. 8, 2006, pp. 1-14.
Kagan, Val A. et al., "Recent Advances and Challenges in Induction Welding of Reinforced Nylon in Automotive Applications", SAE Technical Paper Series, Society of Automotive Engineers, vol. SAE-SP-1850, Mar. 88, 2004, XP007918471, ISSN: 0148-7191, 8 pages.
English language abstract not found for CN 101124396; however, see English language equivalent U.S. Pat. No. 7,174,873. Original document extracted from espacenet.com database on Oct. 11, 2016, 22 pages.

* cited by examiner

FIG. 1
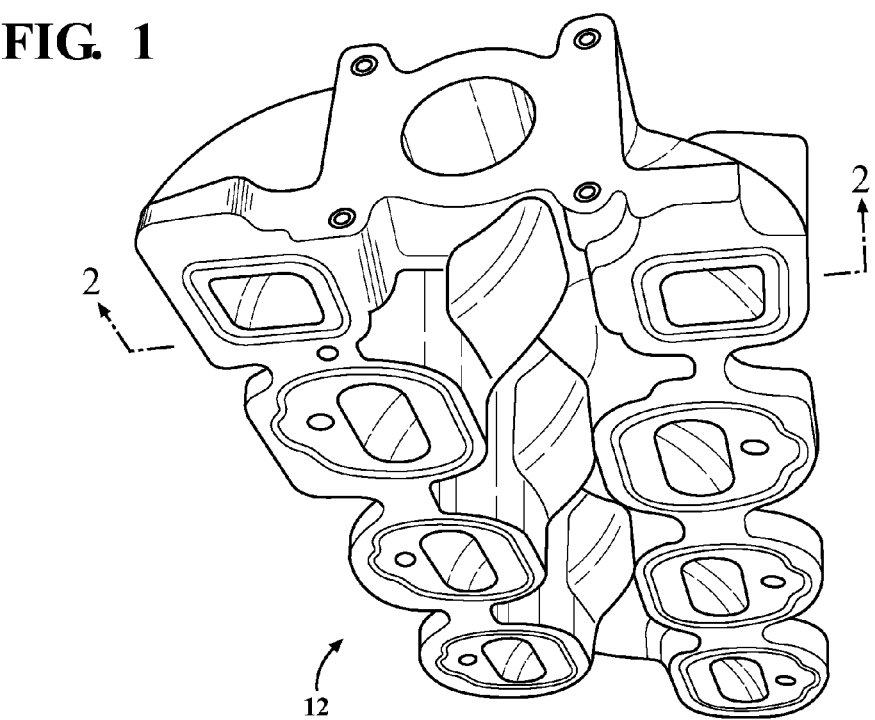
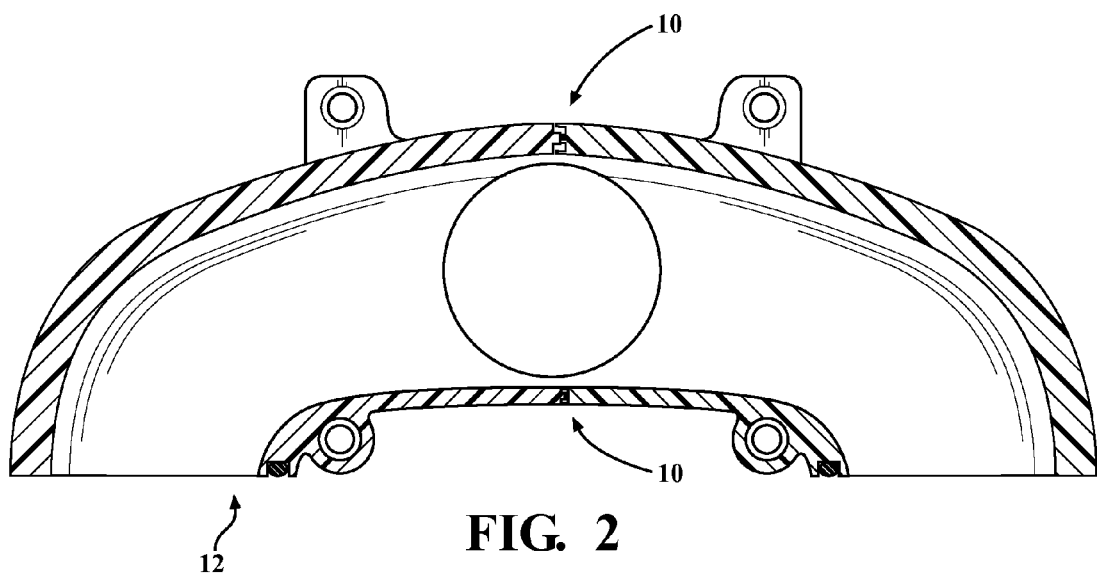
FIG. 2

FRICTIONAL WELD JOINT FOR AN ARTICLE COMPRISING A THERMOPLASTIC MATERIAL

CROSS-REFERENCE TO RELATED APPLICATIONS

This application is the National Stage of International Patent Application No. PCT/US2013/042430, filed on May 23, 2013, which claims priority to and all advantages of U.S. Provisional Patent Application No. 61/650,563, which was filed on May 23, 2012, the disclosure of which is specifically incorporated by reference.

BACKGROUND OF THE INVENTION

1. Field of the Invention

The invention generally relates to an article comprising a thermoplastic material. More specifically, the invention relates to a frictional weld joint used to join two body portions of the article.

2. Description of the Related Art

The use of frictional weld joints for coupling together first and second body portions of an article is known in the art. A typically frictional weld joint comprises a first bead extending from the first body portion and a second bead extending from the second body portion. Each of the first and second beads of the typically frictional weld joint has a contact surface. The contact surfaces of the first and second beads are placed into contact with each other and a force is applied to the first body portion to generate friction at the contact surface of the first and second beads. The first and second beads are made from a thermoplastic material and the friction results in an increased temperature of the thermoplastic material. As a result of the increased temperature of the thermoplastic material, the first and second beads nest with one another. Subsequently, the force is removed from the first body portion for allowing the thermoplastic material to cool, which results in the first and second beads fusing together.

The typically frictional weld joint must be capable of resisting stresses, such as bending, tensile, and compressive loads, that act on the typical frictional weld joint without failure. In the case where the article is an air intake manifolds of an internal combustion engine, the stresses acting on the typical frictional weld joint is the result of pressure that builds up within a hollow interior of the air intake manifold. There is a desire in industry to increase the pressure within the hollow interior of the air intake manifold while still utilizing a friction weld joint. There are also industry limitation for the size of the air intake manifold and the frictional weld joint itself. As such, there remains a need to provide an improved frictional weld joint that meets the demands to resist failure when exposed to increases pressures while still meeting industry limitations for size.

SUMMARY OF THE INVENTION AND ADVANTAGES

A frictional weld joint couples together first and second body portions of an article, which comprises a thermoplastic material. The first body portion has a first nominal wall thickness and a first joint surface. The second body portion has a second nominal wall thickness and a second joint surface substantially parallel to the first joint surface. A total bead height of the frictional weld joint is defined between the first and second joint surfaces. The frictional weld joint comprises a first bead coupled to and extending axially from the first joint surface to define a first bead height. A second bead is coupled to and extends axially from the second joint surface. The second bead is also coupled to the first bead for coupling the first and second body portions together. A final second bead height is defined between the first bead and the second joint surface. A ratio of the first bead height to the second bead height is of from about 0.40 to about 1.70. A ratio of the total bead height to at least one of the first and second nominal wall thicknesses is equal to or less than 6.00. Having the first bead height equal to or greater than the final second bead height and having the ratio of the total bead height to at least one of the first and second nominal wall thicknesses equal to or less than 6.00 reduces a transfer of stresses acting on the first and second body portions to the frictional weld joint. Therefore, the frictional weld joint can resist higher stresses acting on the first and second body portions without the frictional weld joint failing, as compared to prior art weld joints.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 1 is a perspective view of an article for use as an air intake manifold for an internal combustion engine;

FIG. 2 is a cross-sectional view of the article taken along line 2-2 of FIG. 1;

DETAILED DESCRIPTION OF THE EXEMPLARY EMBODIMENT

Referring to the Figures, wherein like numerals indicate corresponding parts throughout the several views, a frictional weld joint 10 for an article 12 is generally shown. As shown in FIGS. 1 and 2, the article 12 may be an air intake manifold for an internal combustion engine. However, it should be understood that the article 12 may be formed into something other than the air intake manifold, such as automotive front and rear tail lamp housings, fuel tanks, or any application wherein two components are joined together using a vibration welding process and still fall within the scope of the disclosure.

Generally, the article 12 comprises a thermoplastic material. It is to be appreciated that the thermoplastic material can be neat, i.e., virgin, uncompounded resin, or that the thermoplastic material can be an engineered product where the resin is compounded with other components, for example with select additives to improve certain physical properties. Additionally, the thermoplastic material may have a regrind content of from about 5-25 percent. Typically, the thermoplastic material is selected from the group of polypropylene, polyvinyl chloride, polystyrene, acrylonitrile butadiene styrene, styrene butadiene, acrylic styrene acrylonitrile, poly methyl methacrylate, polyacetal, polyphenylene oxide, polyethylene terephthalate, polyethylene, polyphenylene sulfide, cellulose acetate, polysulfone, polybutylene terephthalate, polyamide, and combinations thereof. More typically, the thermoplastic material is a polyamide selected from the group of nylon 6, nylon 6/6, polybutylene terephthalate, polyethylene terephthalate, polyacetal, acrylic styrene acrylonitrile, and combinations thereof. However, it should be understood that other thermoplastic materials may also be used to manufacture the article 12. Additionally, the thermoplastic material may be a blend of two or more of the above listed materials. For example, the thermoplastic material may be selected from the group of polyamide blends, a polypropylene and ethylene propylene diene monomer blend, polyphenylene oxide blends, a polycarbonate and acrylonitrile butadiene styrene polymer blend, and a polycarbonate and polybutylene terephthalate blend.

Although not required, the thermoplastic material is typically between 5 and 65 percent filled with fibers, and more preferably, the thermoplastic material is 30 percent filled with fibers It is to be appreciated that the fibers may be short, long, and/or continuous. It is also to be appreciated that the fibers may be glass fibers and/or carbon. Examples of suitable thermoplastic materials include, but are not limited to Ultramid®️ polyamides, Ultradur®️, Ultraform®️, Ultrason®️, Luran®️, and Terluran®️ grades commercially available from BASF Corp.

Figure 3:
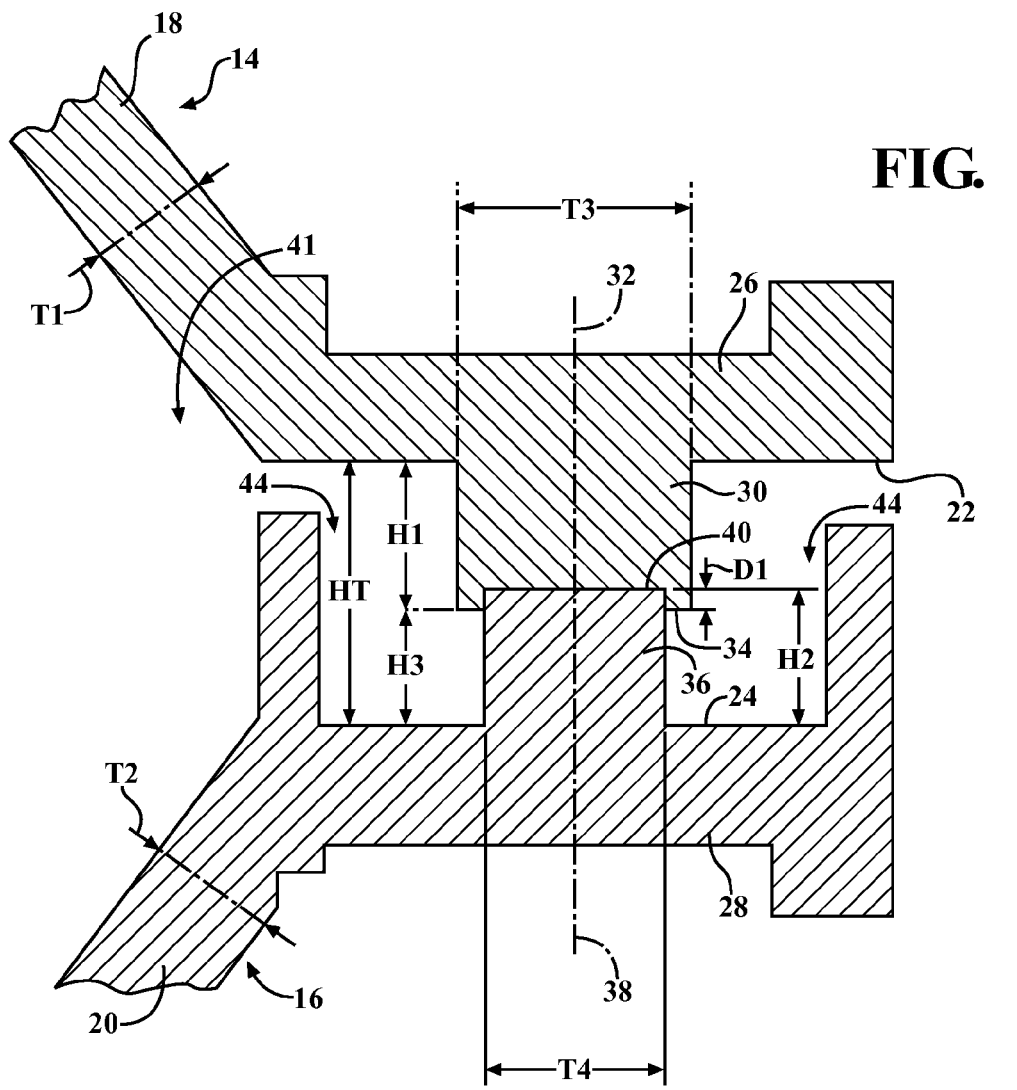
FIG. 3 is a cross-sectional view of a portion of FIG. 2 showing a frictional weld joint.

With reference to FIG. 3, the article 12 comprises a first body portion 14 and a second body portion 16. The first and second body portions 14, 16 are configured for coupling by the frictional weld joint 10 to form the article 12. Said differently, when the first and second body portions 14, 16 are coupled together, the first and second body portions 14, 16 form the article 12. The first body portion 14 has a first nominal wall thickness T1 and the second body portion 16 has a second nominal wall thickness T2. The first and second nominal wall thicknesses T1, T2 are typically defined by a cross-sectional thickness of a wall of the first and/or second body portions 14, 16. More specifically, the first body portion 14 includes a first wall 18 defining the first nominal wall thickness T1 of the first body portion 14. Likewise, the second body portion 16 includes a second wall 20 defining the second nominal wall thickness T2 of the second body portion 16. It is to be appreciated that the first and second nominal wall thicknesses T1, T2 may be the same or different from one another. Typically, the first and second nominal wall thicknesses T1, T2 are of from about 1.50 to about 5.00, more typically from about 2.00 to about 4.00, and even more typically of from about 2.80 to about 3.20 millimeters.

Additionally, each of the first and second body portions 14, 16 have a joint surface. Said differently, the first body portion 14 has a first joint surface 22 and the second body portion 16 has a second joint surface 24. The second joint surface 24 is substantially parallel to the first joint surface 22. The first body portion 14 may have a first flange 26 extending from the first wall 18 with the first joint surface 22 disposed on the first flange 26. Generally, when present, the first wall 18 and the first flange 26 present an L-shaped configuration in cross-section. Likewise, the second body portion 16 has a second flange 28 extending from the second wall 20 with the second joint surface 24 disposed on the second flange 28. Generally, when present, the second wall 20 and the first flange 26 present an L-shaped configuration in cross-section.

The frictional weld joint 10 is disposed between the first and second joint surfaces 22, 24. The frictional weld joint 10 couples together the first and second body portions 14, 16 to form the article 12. The frictional weld joint 10 has a total bead height HT defined between the first and second joint surfaces 22, 24. The total bead height HT is typically of from about 6.5 to about 9.5, more typically of from about 7.00 to 9.00, and even more typically of from about 8.00 to 9.00 millimeters. Typically, a ratio of the total bead height HT to at least one of the first and second nominal wall thicknesses T1, T2 is equal to or less than less than 6.00, more typically from about 1.60 to about 5.50, and even more typically of from about 2.50 to about 3.00.

The frictional weld joint 10 comprises a first bead 30 coupled to and extending axially from the first joint surface 22. The first bead 30 extends axially along a centerline 32 from the first joint surface 22. The first bead 30 extends from the first joint surface 22 and ends at a first contact surface 34 thereby defining a first bead height H1. Typically, the first bead height H1 is of from about 2.00 to about 5.00, more typically of from about 2.50 to about 4.50, and even more typically of from about 4.00 to about 4.50 millimeters. Additionally, the first bead 30 has a thickness T3, which is defined by the cross-sectional thickness of the first bead 30. Generally, the thickness T3 of the first bead 30 is uniform between the first joint surface 22 and the contact surface of the first bead 30. Typically, the thickness T3 of the first bead 30 is of from about 3.00 to about 8.00, more typically of from about 4.00 to about 7.00, and even more typically of from about 6.00 to about 7.00 millimeters. Typically, the thickness T3 of the first bead 30 is less than a cross-sectional thickness of the first flange 26.

The frictional weld joint 10 also comprises a second bead 36 coupled to and extending axially from the second joint surface 24. The second bead 36 extends axially along a centerline 38 from the second joint surface 24. The second bead 36 extends from the second joint surface 24 and ends at a second contact surface 40 thereby defining an initial second bead height H2. Typically, the initial second bead height H2 is of from about 4.00 to about 6.50, more typically of from about 4.60 to about 6.00, and even more typically of from about 5.50 to about 6.00 millimeters. Additionally, the second bead 36 has a thickness T4, which is defined by the cross-sectional thickness of the second bead 36. Generally, the thickness T4 of the second bead 36 is uniform between the second joint surface 24 and the second contact surface 40 of the second bead 36. Typically, the thickness T4 of the second bead 36 is of from about 1.50 to about 7.00, more typically of from about 3.00 to about 6.00, and most typically of from about 4.00 to about 5.00 millimeters. Typically, the thickness T4 of the second bead 36 is less than a cross-sectional thickness of the second flange 28.

It is to be appreciated that the first and second beads 30, 36 may have any suitable cross-sectional configuration. For example, each of the first and second beads 30, 36 may have a rectangular cross-section, or a circular cross-section. It is to be appreciated that the first bead 30 may have a different cross-section as compared to the second bead 36. For example, the first bead 30 may have the rectangular cross-section and the second bead 36 may have the circular cross-section.

Typically, the first and second beads 30, 36 comprise the thermoplastic material of the article 12. For example, the first and second beads 30, 36 may comprise unfilled and/or glass filled nylon, nylon 6/6, polyvinyl chloride, polybutylene terephthalate, polyacetal, and combinations thereof. It is to be appreciated that the first and second beads 30, 36 may comprise a different thermoplastic material as compared to the thermoplastic material of the first and second body portions 14, 16.

Prior to coupling the first and second body portions 14, 16 together, the second bead 36 is spaced from the first bead 30. To couple the first and second beads 30, 36 together, the first and second beads 30, 36 are positioned in contact with each other. More specifically, the contact surfaces 34, 40 of each of the first and second beads 30, 36 is positioned in contact with each other. Generally, the centerlines 32, 38 of the first and second beads 30, 36 are aligned with each other prior to coupling the first and second beads 30, 36 together. A clamp pressure may be applied to the first and second body portions 14, 16 to temporarily hold the first and second body portions 14, 16 together. The clamp pressure is typically of from about 1.0 to about 7.0, more typically of from about 1.2 to about 4.0, even more typically of from about 1.5 to about 2.5 Mpa.

A force is applied to either the first or second body portions 14, 16 of the article 12 to generate friction between the first and second beads 30, 36. The application of the force results in the production of friction between the contact surface of the first and second beads 30, 36. The friction generates heat that results in a heating of the thermoplastic material of the first and second beads 30, 36 from a normal temperature towards a melting temperature of the thermoplastic material. The application of the force may be further defined as frictionally welding the first and second beads 30, 36 together such that one of the first or second body portions 14, 16 reciprocate against the other one of the first and second beads 30, 36 at a low frequency. Typically, the low frequency used in the frictional welding is of from about 100 to about 300, more typically of from about 150 to about 240, and even more typically of from about 180 to about 220 hertz. Additionally, it is to be appreciated that the application of the force may be further defined as ultrasonically welding the first and second beads 30, 36 together such that one of the first or second body portions 14, 16 reciprocate against the other one of the first and second beads 30, 36 at a high frequency. The high frequency used in ultrasonic welding is typically of from about 15,000 to about 72,000, more typically of from about 15,000 to about 60,000, and even more typically of from about 15,000 to about 40,000 hertz.

The heating of the first and second beads 30, 36 allows either the first or second beads 30, 36 to penetrate the other one of the first and second beads 30, 36. Said differently, as the thermoplastic material of the first and second beads 30, 36 approaches the melting temperature of the thermoplastic material, at least one of the first or second beads 30, 36 penetrates the other. It is to be appreciated that the pressure holding the first and second beads 30, 36 together may also be present during the step of applying the force to help force the first or second beads 30, 36 to penetrate the other one of the first and second beads 30, 36.

The force is removed for allowing the first and second beads 30, 36 to fuse together to couple together the first body portion 14 and the second body portion 16 of the article 12. Generally, once the force is removed, the heat that was generated by the friction rapidly dissipates and the thermoplastic material of the first and second beads 30, 36 fuse together as the normal temperature of the first and second beads 30, 36 is reached. Said differently, once the force is removed, the first and second beads 30, 36 are coupled together for joining the first and second body portions 14, 16 of the article 12. It is to be appreciated that the second bead 36 may be coupled to the first bead 30, the first bead 30 may be coupled to the second bead 36, or the first and second beads 30, 36 may be coupled to each other for coupling said first and second body portions 14, 16 together.

Typically, the force is applied to the first body portion 14 to allow the second bead 36 to penetrate the first bead 30, as shown in FIG. 3. In such an embodiment, the second bead 36 is at least partially disposed within the first bead 30 after the force is removed from the first body portion 14. The second bead 36 penetrates the first bead 30 by a distance D1, which is typically of from about 0.25 to about 2.20 millimeters, more typically of from about 1.00 to about 2.00 millimeters, and even more typically of from about 1.50 to about 1.80 millimeters. However, it is to be appreciated that the second bead 36 may penetrate the first bead 30 such that the second bead 36 is fully encompassed by the first bead 30. Additionally, it is to be appreciated that if the force is applied to the second body portion 16 instead of the first body portion 14, then the first bead 30 will penetrate the second bead 36 in a similar fashion as the second bead 36 described above.

When the second bead 36 penetrates the first bead 30, the second bead 36 has a final second bead height H3, which is defined between the first bead 30 and the second joint surface 24. Typically, a ratio of the first bead height H1 to the final second bead height H3 is of from about 0.40 to about 1.70, more typically of from about 0.50 to about 1.25, and even more typically of from about 0.98 to about 1.0. Typically, the final second bead height H3 is of from about 2.50 to about 5.00, more typically from about 3.00 to about 4.50, and even more typically of from about 4.00 to about 4.50 millimeters. It is to be appreciated that the final second bead height H3 of the second bead 36 may be equal to or greater than the first bead height H1.

Generally, the article 12 has an interior chamber defined by the first and second body portions 14, 16. The frictional weld joint 10 is disposed about the interior chamber. During normal use of the article 12, the chamber may undergo a pressure increase. For example, when the article 12 is the air intake manifold, pressure increases within the air intake manifold. The pressure increase causes a moment force to act on the frictional weld joint 10. The moment force results in a combination of a bending load, a tensile load, and a compressive load acting on the frictional weld joint 10. As such, the frictional weld joint 10 must be able to withstand stresses imparted on the frictional weld joint 10 due to the bending, tensile, and compressive loads without failure.

Without wishing to be bound by theory, it is believed that providing the frictional weld joint 10 with the ratio between the final second bead height H3 to the first bead height H1 described above and having the ratio of the total bead height HT to at least one of the first and second nominal wall thicknesses T1, T2 as described above, reduces the stresses acting on the frictional weld joint 10 as a result of stresses acting on the first and second body portions 14, 16 are reduced. An example of stresses acting on the first and second body portions 14, 16 is increased pressure within an interior chamber 41 of the article 12. A strength of the frictional weld joint 10 is increased with the reduction of stresses transferred to the frictional weld joint 10. Therefore, the article 12 can experience greater pressures without the frictional weld joint 10 failing, as compared to other weld joints not meeting the ratio requirements described above. As such, it is believed that the combination the ratio of the final bead height H3 to the first bead height H1 and the ratio for total bead height HT reduces the stresses resulting from bending, tensile, and compressive loads that act on the frictional weld joint 10 as the pressure within the chamber increases. Limiting the stresses acting on the frictional weld joint 10 resulting form increased pressure within the chamber increases the burst strength of the frictional weld joint 10.

The heating of the first and second beads 30, 36 also results in the production of flash. Therefore, the second body portion 16 may include a first flash dam and a second flash dam, respectively. Each of the flash dams extends from the second joint surface 24. The flash dams are spaced apart from each other with the second bead 36 spaced from and disposed between the flash dams. A cavity 44 is defined between each of the flash dams and the second bead 36 for collecting the flash as it is produced. The cavity 44 collects the flash within the frictional weld joint 10 thereby preventing the flash from becoming loose within the article 12. It is also desirable to capture flash from an aesthetics standpoint, which is also a key application requirements when the article 12 is the air-intake manifold. It has been observed that increasing a thickness of the flash dams increases the burst strength of the frictional weld joint 10. However, the thickness of the flash dams cannot become to large or else there will be no cavity to capture the flash. Typically, the flash dams have a thickness of from about 0.50 to about 4.00, more typically from about 0.80 to about 3.25, and even more typically of from about 2.50 to about 3.00 millimeters.

Additionally, it is to be appreciated that the first bead 30 and/or the second bead 36 may be split into interior and exterior stems. It is further to be appreciated that when either the first bead 30 or the second bead 36 are split into the interior and exterior stems, the centerline 32 of the first bead 30 may be offset from the centerline 38 of the second bead 36. It is believed that splitting the first and/or second beads 30, 36 into the interior and exterior stems and offsetting the centerlines 32, 38 reduces the stresses resulting from bending, tensile, and compressive loads that act on the frictional weld joint 10 as the pressure within the chamber increases. Limiting the stresses acting on the frictional weld joint 10 resulting form increased pressure within the chamber increases the burst strength of the frictional weld joint 10.

Although the above description has been described for coupling together the first and second body portions 14, 16 of the article 12, it is to be appreciated that the frictional weld joint 10 can be used to couple together any thermoplastic bodies, including multiple article 12.

EXAMPLES

Figure 4:
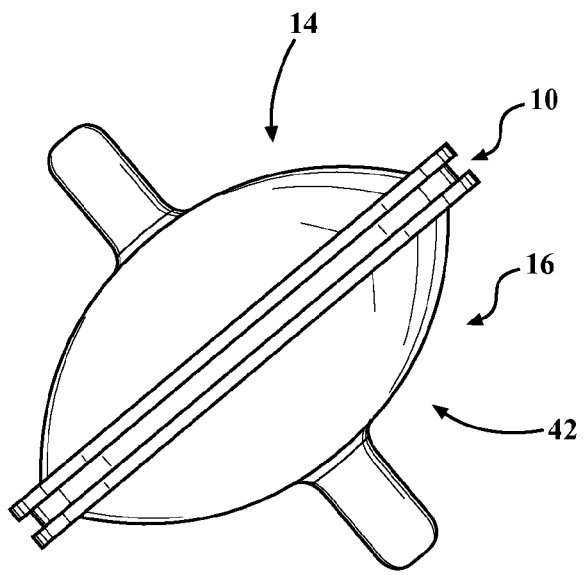
FIG. 4 is a perspective view of one of a plurality of test articles having the frictional weld joint.

A plurality of test articles 42 are produced. An example of the test articles 42 is shown in FIG. 4. The test articles 42 have the first and second body portions 14, 16 joined together by a joint. However, the total bead height HT of each of the test articles 42 is varied. The variation of the total bead height HT is accomplished by adjusting at least one of the first bead height H1 or the final second bead height H3 of the first and second beads 30, 36, respectively. The first bead 30 has a thickness of 6.00 millimeters and the second bead 36 has a thickness of 4.00 millimeters. The nominal wall thickness of the first and second body portions 14, 16 of the test articles 42 is about 3.00 millimeters. The joint is formed as described above using the same dam pressure for all of the test articles 42. A first pressure failure test is performed by increasing the pressure within the test articles 42 until the test articles 42 failed. The results are provided in Table 1 below.

TABLE 1

| First Pressure Failure Test | | | |
|---|---|---|---|
| Test Article No. | Ratio of the First Bead Height to the Final Second Bead Height | Total Bead Height (mm) | Burst Strength (Bars) |
| 1 | 1.24 | 6.95 | 11.3 |
| 2 | 1.57 | 7.96 | 11.5 |
| 3 | 1.7 | 7.45 | 11.23 |
| 4 | 0.41 | 6.91 | 11.27 |

TABLE 1-continued

| First Pressure Failure Test | | | |
|---|---|---|---|
| Test Article No. | Ratio of the First Bead Height to the Final Second Bead Height | Total Bead Height (mm) | Burst Strength (Bars) |
| 5 | 0.57 | 6.91 | 11.37 |
| 6 | 0.77 | 6.91 | 11.37 |
| 7 | 1.01 | 6.91 | 11.39 |
| 8 | 0.98 | 6.91 | 11.45 |
| 9 | 1.01 | 5.01 | 9.85 |
| 10 | 0.98 | 8.91 | 13.54 |
| 11 | 0.98 | 7.91 | 12.37 |

As exhibited in Table 1, the test articles 42 with the ratio of the first bead height H1 to the final second bead height H3 equal to or less than 1 is stronger than the test articles 42 with the ratio of the first bead height H1 to the final second bead height H3 grater than 1. For example, with reference to test article numbers 7 and 8 of the table, the strength increased for test article 8 versus 7 because test article 8 had ratio of the first bead height H1 to the final second bead height H3 of less than 1.

Additionally, increasing the total bead height HT and, therefore, increasing the ratio of the total bead height HT to the nominal wall thickness also resulted in a stronger joint. For example, a comparison of test article 8 verses test articles 42 10 and 11 demonstrate that while the ratio of the first bead height H1 to the final second bead height H3 remains constant, increasing the ration of the total bead height HT to the nominal wall thickness resulted in a stronger joint. It is expected that simply increasing the total bead height HT would not have an effect on the strength of the joint because the contact area between the first and second beads 30, 36 remains constant. However, as demonstrated in the results of Table 1, increasing the total bead height HT did have an positive impact on the strength of the joint.

A second pressure failure test is performed determine the effect of adjusting the thickness of the flash dams. Additional test articles 42 are formed as described above. Pressure within the test articles 42 was then increased until the test articles 42 failed. The results are provided in Table 2 below.

TABLE 2

| Second Pressure Failure Test | | | | |
|---|---|---|---|---|
| Test Article No. | Ratio of the First Bead Height to the Final Second Bead Height | Total bead height (mm) | Thickness of Flash Dams (mm) | Burst Strength (Bars) |
| 12 | 0.98 | 8.91 | 3.0 | 14.81 |
| 13 | 0.98 | 8.91 | 2.6 | 14.41 |

As shown in Table 2, increasing the thickness of the flash dams results in an increased strength of the joint. For example, a comparison of test article number 10 of Table 1 versus test article numbers 12 and 13 demonstrates that while the ratio of the first bead height H1 to the final second bead height H3 and the ratio of the total bead height HT to the nominal wall thickness remain constant, increasing the thickness of the flash dams resulted in an increased strength. It is important to note that generally, it is not desirable to increase the thickness of the flash dams because doing so reduces a volume of the cavity to capture the flash. However, because the total bead height HT has been increased, the thickness of the flash dams can be increased within adversely affecting the volume of the cavity. Therefore, increasing the total bead height HT allows for the thickness of the flash dams to be increased, which results in the test articles 42 resisting higher pressures before failure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article comprising a thermoplastic material, said article comprising:
    a first body portion having a first nominal wall thickness and a first joint surface;
    a second body portion having a second nominal wall thickness and a second joint surface substantially parallel to said first joint surface; and
    a frictional weld joint disposed between said first and second joint surfaces with said frictional weld joint having a total bead height defined between said first and second joint surfaces, said frictional weld joint comprising:
        a first bead coupled to and extending axially from said first joint surface defining a first bead height; and
        a second bead coupled to and extending axially from said second joint surface and coupled to said first bead for coupling said first and second body portions together with a final second bead height defined between said first bead and said second joint surface;
        wherein a ratio of said first bead height to said final second bead height is of from about 0.40 to about 1.70;
        wherein a ratio of said total bead height to at least one of said first and second nominal wall thicknesses is from about 1.60 to about 5.50; and
        wherein said total bead height is of from about 6.5 to about 9.5 millimeters.

2. An article as set forth in claim 1 wherein said ratio of said first bead height to said final second bead height is equal to or less than 1.00.

3. An article as set forth in claim 2 wherein said first bead height is of from about 2.00 to about 5.00 millimeters.

4. An article as set forth in claim 3 wherein said final second bead height is of from about 2.50 to about 5.00 millimeters.

5. A article as set forth in claim 1 wherein said first and second nominal wall thicknesses are of from about 1.50 to about 5.00 millimeters.

6. An article as set forth in claim 1 wherein said first body portion includes a first wall defining said nominal wall thickness of said first body portion and said second body portion includes a second wall defining said nominal wall thickness of said second body portion.

7. An article as set forth in claim 6 wherein said first body portion has a first flange extending from said first wall with said first joint surface disposed on said first flange.

8. An article as set forth in claim 7 wherein said second body portion has a second flange extending from said second wall with said second joint surface disposed on said second flange.

9. An article as set forth in claim 8 wherein said first bead and said second bead each have a thickness that is less than a cross-sectional thickness of said first and second flanges.

10. An article as set forth in claim 1 wherein said second body portion includes a first flash dam and a second flash dam each extending from said second joint surface with said second flash dam spaced from said first flash dam with said second bead spaced from and disposed between said flash dams.

11. An article as set forth in claim 10 wherein said flash dams have a thickness of from about 0.50 to about 4.00 millimeters.

12. An article as set forth in claim 1 wherein said first and second beads comprise a material selected from the group of nylon 6, nylon 6/6, polyvinyl chloride, polybutylene terephthalate, polyacetal, and combinations thereof.

13. An article as set forth in claim 1 wherein said second bead is at least partially disposed within said first bead.

14. An article comprising a thermoplastic material, said article comprising:
    a first body portion having a first nominal wall thickness and a first joint surface;
    a second body portion having a second nominal wall thickness and a second joint surface substantially parallel to said first joint surface;
    a frictional weld joint disposed between said first and second joint surfaces with said frictional weld joint having a total bead height defined between said first and second joint surfaces, said frictional weld joint comprising;
    a first bead coupled to and extending axially from said first joint surface defining a first bead height; and
    a second bead coupled to and extending axially from said second joint surface and coupled to said first bead for coupling the first and second body portions together with a final second bead height defined between said first bead and said second joint surface;
    wherein a ratio of said total bead height to at least one of said first and second nominal wall thicknesses is from about 1.60 to about 5.50;
    wherein said total bead height is of from about 6.5 to about 9.5 millimeters;
    wherein said second body portion includes a first flash dam and a second flash dam each extending from said second joint surface with said second flash dam spaced from said first flash dam with said second bead spaced from and disposed between said flash dams; and
    wherein said flash dams have a thickness of from about 0.50 to about 4.00 millimeters.

15. An article as set forth in claim 14 wherein a ratio of said first bead height to said final second bead height is equal to or less than 1.00.

16. An article as set forth in claim 15 wherein said first bead height is of from about 2.00 to about 5.00 millimeters.

17. An article as set forth in claim 16 wherein said final second bead height is of from about 2.50 to about 5.00 millimeters.

18. An article as set forth in claim 14 wherein said ratio of said total bead height to said nominal wall thickness of at least one of said first and second body portions is of from about 1.60 to about 5.50.

19. An article as set forth in claim 14 wherein said first and second beads comprise a material selected from the group of nylon 6, nylon 6/6, polyvinyl chloride, polybutylene terephthalate, polyacetal, and combinations thereof.

20. An article as set forth in claim 14 wherein said second bead is at least partially disposed within said first bead.

\* \* \* \* \*